United States Patent
Takahashi et al.

(10) Patent No.: US 12,533,180 B2
(45) Date of Patent: Jan. 27, 2026

(54) MEDICAL DEVICE

(71) Applicant: TERUMO KABUSHIKI KAISHA, Tokyo (JP)

(72) Inventors: Yusuke Takahashi, Hadano (JP); Yukitoshi Kato, Hadano (JP); Tomoaki Takemura, Kawasaki (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 838 days.

(21) Appl. No.: 17/034,117

(22) Filed: Sep. 28, 2020

(65) Prior Publication Data
US 2021/0007800 A1    Jan. 14, 2021

Related U.S. Application Data

(63) Continuation of application No. PCT/JP2019/012384, filed on Mar. 25, 2019.

(30) Foreign Application Priority Data

Mar. 29, 2018 (JP) .................. 2018-064007

(51) Int. Cl.
*A61B 18/14* (2006.01)
*A61B 18/00* (2006.01)

(52) U.S. Cl.
CPC ............ *A61B 18/1492* (2013.01); *A61B 2018/00214* (2013.01); *A61B 2018/00267* (2013.01);
(Continued)

(58) Field of Classification Search
CPC ...... A61B 18/1492; A61B 2018/00214; A61B 2018/00267; A61B 2018/00351;
(Continued)

(56) References Cited

U.S. PATENT DOCUMENTS 5,853,422 A    12/1998 Huebsch et al.
8,882,697 B2   11/2014 Celermajer et al.
(Continued)

FOREIGN PATENT DOCUMENTS

JP    2009512521 A    3/2009
JP    2012050538 A    3/2012
(Continued)

OTHER PUBLICATIONS

The extended European Search Report issued Apr. 9, 2021, by the European Patent Office in corresponding European Patent Application No. 19776105.9-1122. (6 pages).
(Continued)

*Primary Examiner* — Thomas A Giuliani
*Assistant Examiner* — Abigail M Ziegler
(74) *Attorney, Agent, or Firm* — .Buchanan Ingersoll & Rooney PC

(57) ABSTRACT

A medical device is disclosed which can suppress torsion of a wire in a circumferential direction in an expansion body formed using the wire. A medical device is disclosed, which enlarges a biological tissue. The medical device includes an elongated shaft portion and an expansion body disposed in a distal portion of the shaft portion. The expansion body has a wire portion configured to expand and contract in a radial direction, and a torsion restriction portion that restricts movement of the wire portion in a circumferential direction of the expansion body.

18 Claims, 12 Drawing Sheets

(52) U.S. Cl.
CPC .............. *A61B 2018/00351* (2013.01); *A61B 2018/00357* (2013.01); *A61B 2018/1467* (2013.01)

(58) Field of Classification Search
CPC .............. A61B 2018/00357; A61B 2018/1467; A61B 90/02; A61B 17/00
See application file for complete search history.

(56) References Cited

U.S. PATENT DOCUMENTS

| | | | |
|---|---|---|---|
| 2007/0118176 A1 | 5/2007 | Opolski et al. | |
| 2016/0022970 A1 | 1/2016 | Forcucci et al. | |
| 2020/0261704 A1* | 8/2020 | Wang | A61F 2/90 |
| 2020/0289196 A1* | 9/2020 | Arevalos | A61B 17/320016 |

FOREIGN PATENT DOCUMENTS

| | | |
|---|---|---|
| WO | 2014/150106 A1 | 9/2014 |
| WO | 2016/178171 A1 | 11/2016 |
| WO | 2019085841 A1 | 5/2019 |

OTHER PUBLICATIONS

English Translations of the International Search Report (Form PCT/ISA/210) and the Written Opinion of the International Searching Authority (Form PCT/ISA/237) issued May 14, 2019, by the Japanese Patent Office in corresponding International Application No. PCT/JP2019/012384. (8 pages).

International Search Report (PCT/ISA/210) and translation and Written Opinion (PCT/ISA/237) mailed on May 14, 2019, by the Japanese Patent Office as the International Searching Authority for International Application No. PCT/JP2019/012384.

* cited by examiner

MEDICAL DEVICE

CROSS-REFERENCES TO RELATED APPLICATIONS

This application is a continuation of International Application No. PCT/JP2019/012384 filed on Mar. 25, 2019, which claims priority to Japanese Patent Application No. 2018-064007 filed on Mar. 29, 2018, the entire content of both which is incorporated herein by reference.

FIELD

The present disclosure generally relates to a medical device including a maintenance treatment element configured to apply energy to a biological tissue, and a treatment method configured to apply energy to a biological tissue.

BACKGROUND DISCUSSION

Chronic heart failure is a known heart disease.

Chronic heart failure is broadly classified into a systolic heart failure and a diastolic heart failure, based on a cardiac function index.

In a patient suffering from the diastolic heart failure, myocardial hypertrophy appears, and stiffness (hardness) increases. Consequently, blood pressure increases in a left atrium, and a cardiac pumping function is degraded.

In this manner, the patient may show heart failure symptoms such as a pulmonary edema.

In addition, another heart disease of a patient who shows the following heart failure symptom where due to pulmonary hypertension, blood pressure increases on a right atrium side, and the cardiac pumping function is degraded.

In recent years, a shunt treatment has attracted attention. For the patients who suffer from the heart failure, a shunt (through-hole) serving as an escape route for increased atrial pressure is formed in an atrial septum, thereby enabling heart failure symptom to be alleviated.

In the shunt treatment, the atrial septum is accessed using an intravenous approaching method, and the through-hole is formed having a desired size.

For example, a medical device disclosed in U.S. Pat. No. 8,882,697 may be used for performing the shunt treatment on the atrial septum.

According to the medical device disclosed in U.S. Pat. No. 8,882,697, a shunt hole is enlarged using a balloon serving as an expansion body disposed in a distal portion of a shaft portion, and a through-hole is maintained by an electrode disposed in the balloon.

However, when the through-hole is enlarged, the medical device blocks the through-hole with the balloon. Accordingly, hemodynamics cannot be confirmed.

Therefore, the hemodynamics are confirmed after the balloon is removed, and thus, a therapeutic effect obtained by the through-hole cannot be immediately confirmed.

In order to confirm the hemodynamics when the through-hole is enlarged, it is conceivable that the expansion body is formed using wires to enable blood to flow from a space between the wires of the expansion body.

However, in a case where the expansion body are formed using the wires, the wires may have torsion in a circumferential direction when the expansion body expands, thereby causing a possibility that an expansion force may not be sufficiently transmitted to a biological tissue.

SUMMARY

A medical device is disclosed which can suppress torsion of wires in a circumferential direction in an expansion body formed using the wires.

In accordance with an aspect, a medical device is disclosed, which enlarges a biological tissue and includes an elongated shaft portion, and an expansion body disposed in a distal portion of the shaft portion, and configured to expand and contract in a radial direction. The expansion body has a wire portion linked with the shaft portion, and a torsion restriction portion that restricts movement of the wire portion in a circumferential direction.

In accordance with another aspect, a medical device is disclosed comprising: an elongated shaft portion; an expansion body disposed in a distal portion of the shaft portion, the expansion portion including a plurality of wire portions in a circumferential direction configured to expand and contract in a radial direction; a plurality of electrodes disposed on the expansion body; wherein each of the plurality of wires comprises: a recessed portion recessed radially inward; a proximal side expansion portion extending from a proximal end of the expansion body to the recessed portion; and a distal side expansion portion extending from a distal end of the expansion body to the recessed portion; wherein at least one of the proximal side expansion portion and the distal side expansion portion comprises: a bifurcated portion so as to divide a wire into two bifurcated lines; and a merged portion such that each of the two bifurcated line merges separately with a bifurcated line bifurcated from a wire adjacent to the wire in the circumferential direction; and wherein the recessed portion is formed with a merged wire portion extending from the merged portion, and includes a proximal side surface and a distal side surface.

In accordance with an aspect, each of the plurality of electrodes is disposed on the proximal side surface of the recessed portion.

In accordance with another aspect, a treatment method is disclosed for enlarging a through-hole of a biological tissue by using a medical device having a plurality of wire portions arranged in a circumferential direction, the method comprising: positioning a recessed portion of each of the plurality of wires of the expansion body in the through-hole of the biological tissue, each of the plurality of wires comprising the recessed portion recessed radially inward, a proximal side expansion portion extending from a proximal end of the expansion body to the recessed portion; and a distal side expansion portion extending from a distal end of the expansion body to the recessed portion; expanding the expansion body in the through-hole and causing the recessed portion to move radially outward; enlarging a diameter of the through-hole by the recessed portion expanding radially outward into the biological tissue; and performing a maintenance treatment by using a maintenance treatment element arranged on the expansion body.

In accordance with an aspect, the medical device configured as described above can suppress torsion in the circumferential direction when the expansion body formed using the wire expands.

DETAILED DESCRIPTION

Figure 1:
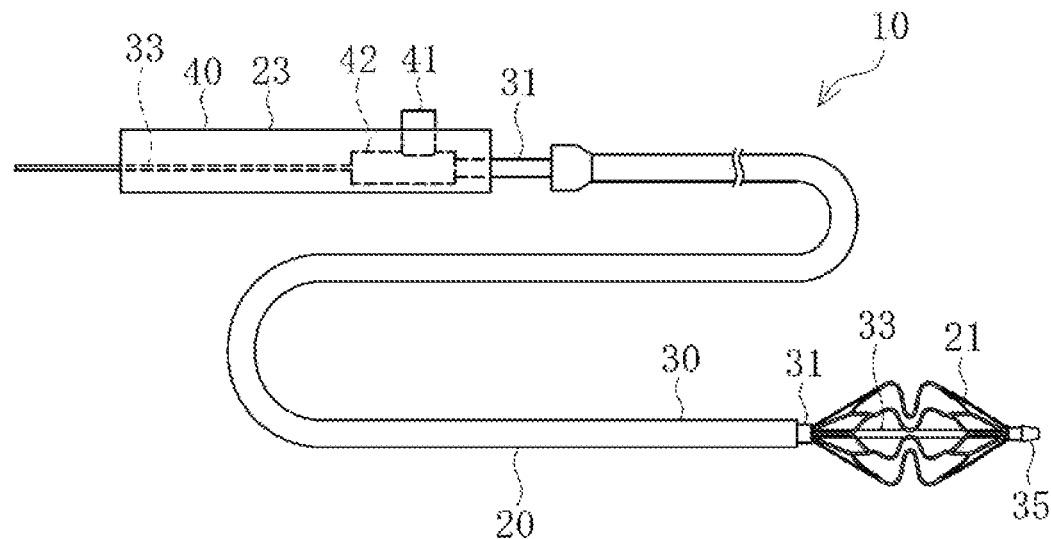
FIG. 1 is a front view illustrating an overall configuration of a medical device having an expansion body according to a first exemplary embodiment.

Set forth below with reference to the accompanying drawings is a detailed description of embodiments of a medical device including a maintenance treatment element configured to apply energy to a biological tissue, and a treatment method configured to apply energy to a biological tissue representing examples of the inventive medical device and treatment method. Note that since embodiments described below are preferred specific examples of the present disclosure, although various technically preferable limitations are given, the scope of the present disclosure is not limited to the embodiments unless otherwise specified in the following descriptions.

In some cases, dimensional ratios in the drawings may be exaggerated and different from actual ratios for convenience of description.

In addition, in the present disclosure, a side on which a medical device 10 is inserted into a biological lumen will be referred to as a "distal end" or a "distal side", and an operating hand-side will be referred to as a "proximal end" or a "proximal side".

The medical device 10 according to the embodiments described herein is configured as follows. A through-hole Hh formed in an atrial septum HA of a patient's heart H is enlarged, and further, a maintenance treatment is performed so that the through-hole Hh having an increased diameter is maintained to have an increased size.

Medical Device Having Expansion Body of First Exemplary Embodiment

As illustrated in FIG. 1, the medical device 10 according to the present exemplary embodiment includes an elongated shaft portion 20, an expansion body 21 disposed in a distal portion of the shaft portion 20, and an operation unit 23 disposed in a proximal portion of the shaft portion 20.

The expansion body 21 includes a maintenance treatment element (energy transfer element) 22 for performing the above-described maintenance treatment.

The shaft portion 20 has an outer shaft 31 that holds the expansion body 21 in the distal portion, and a storage sheath 30 that stores the outer shaft 31.

The storage sheath 30 is movable forward and rearward from the outer shaft 31 in an axial direction.

In a state where the storage sheath 30 is moved to the distal side of the shaft portion 20, the storage sheath 30 can internally store the expansion body 21.

In a state where the expansion body 21 is stored, the storage sheath 30 is can be moved to the proximal side, and the expansion body 21 can be exposed from the storage sheath 30.

A pulling shaft 33 fixed to the distal portion of the expansion body 21 is stored inside the outer shaft 31.

The pulling shaft 33 projects from the distal end of the outer shaft 31 to the distal side of the outer shaft 31, and a distal portion of the pulling shaft 33 is fixed to a distal member 35 disposed in the distal portion of the expansion body 21.

A proximal portion of the pulling shaft 33 is drawn out (i.e., extends) to the proximal side of the operation unit 23.

The operation unit 23 has a housing 40 gripped by an operator, an operation dial 41 that can be rotationally operated by the operator, and a conversion mechanism 42 operated in conjunction with the rotation of the operation dial 41.

The pulling shaft 33 is held inside the operation unit 23 by the conversion mechanism 42.

In conjunction with the rotation of the operation dial 41, the conversion mechanism 42 can move the held pulling shaft 33 forward and backward in the axial direction.

For example, a rack and pinion mechanism can be used as the conversion mechanism 42.

The expansion body 21 will be described in more detail.

Figure 2:
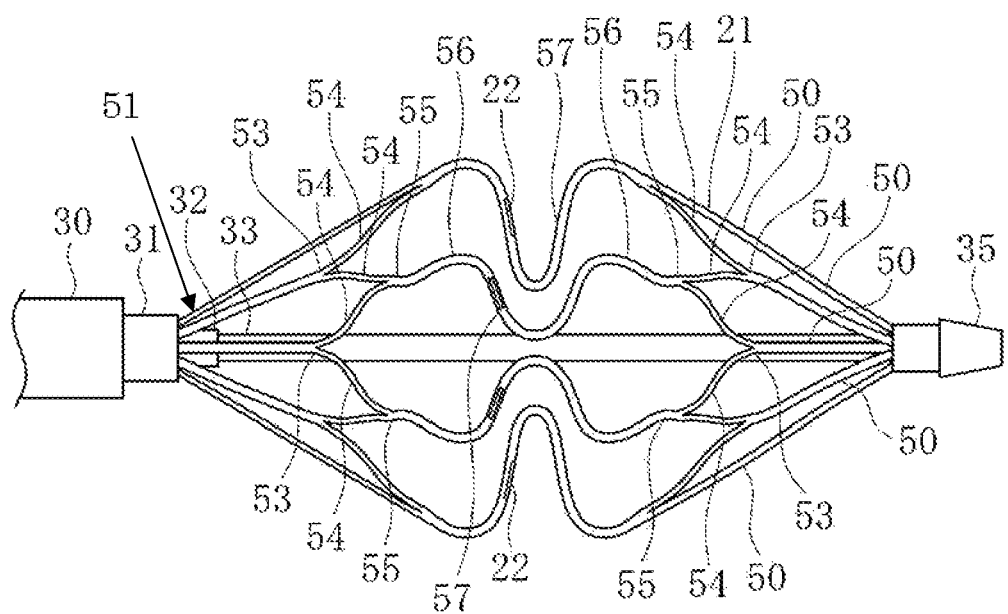
FIG. 2 is an enlarged front view illustrating the vicinity of the expansion body.

As illustrated in FIG. 2, the expansion body 21 includes a plurality of wire portions 50 arranged in a circumferential direction.

The wire portions 50 are respectively configured to expand and contract in a radial direction.

The proximal portion of the wire portion 50 extends from the distal end to the distal side of the outer shaft 31.

The distal portion of the wire portion 50 extends from the distal member 35 to the proximal side.

The wire portion 50 extending from a proximal portion 51 is inclined so that the diameter of the expansion body 21 increases toward a central portion, and an intermediate position toward the central portion has a bifurcated portion 53.

The wire portion 50 is divided into two thin bifurcated line 54 in a bifurcated portion 53.

The bifurcated line 54 merges with the bifurcated line 54 bifurcated from the wire portion 50 adjacent in the circumferential direction in a merging portion 55.

A central wire portion 56 is located on a central side of the expansion body 21 from the merging portion 55.

The wire portion 50 has the bifurcated portion 53 and the merging portion 55 in this way. Accordingly, the wire portion 50 is connected to the wire portion 50 adjacent in the circumferential direction by the bifurcated line 54.

The wire portions 50 adjacent to each other in the circumferential direction are connected to each other. Accordingly, when the diameter of the expansion body 21 increases, the wire portions 50 are mutually restricted in moving (i.e., twisting) in the circumferential direction, and it is possible to suppress torsion of the expansion body 21.

That is, the bifurcated line 54 functions as a torsion restriction portion of the expansion body 21.

Here, the description that the wire portions 50 are connected to each other includes a meaning that as in the present embodiment, one wire is bifurcated into two and the bifurcated wires merge with each other to form a shape of one wire.

That is, the wire forming the expansion body 21 is continuous from the proximal end to the distal end, and has a shape in which a portion of the wire is bifurcated into the bifurcated lines 54 and the bifurcated lines 54 merge with each other.

In accordance with an exemplary embodiment, the wire having this shape can be formed by performing laser cutting on a single metal cylindrical member.

The central wire portion 56 has a recessed portion 57 in the central portion.

The recessed portion 57 can grip (i.e., pinch) the biological tissue.

In the present embodiment, the recessed portion 57 grips the atrial septum HA.

In the expansion body 21, the proximal side and the distal side have a symmetrical shape around the recessed portion 57.

That is, from a distal portion 52 toward the center side, the wire portion 50 has the bifurcated portion 53, is bifurcated from the bifurcated portion 53 into the two bifurcated lines 54, and the bifurcated lines 54 merge with each other in the merging portion 55, thereby forming the central wire portion 56 having the recessed portion 57.

In the expansion body 21, the proximal side and the distal side have symmetrical shape. In this manner, a force acting along the axial direction is applied to the wire portion 50 when the expansion body 21 expands. Accordingly, the wire portion 50 is less likely to have torsion (i.e., twisting in circumferential direction).

For example, the wire portion 50 may have a shape of a flat plate cut out from a cylindrical member.

The wire forming the expansion body 21 can have, for example, a thickness of 50 µm to 500 µm and a width of 0.3 mm to 2.0 mm.

However, the wire may have a diameter outside this range.

In addition, the wire portion 50 may have a circular shape in a cross section, or the wire portion 50 may have other shapes in a cross section.

In accordance with an embodiment, a maintenance treatment element 22 may be disposed in the recessed portion 57.

The maintenance treatment element 22 is disposed on a proximal side surface of the recessed portion 57.

When the recessed portion 57 grips the atrial septum HA, the proximal side surface of the recessed portion 57 is located on the right atrium side. Accordingly, energy from the maintenance treatment element 22 is transferred to the atrial septum HA from the right atrium side.

It is desirable that the maintenance treatment element 22 is disposed in a projection portion projecting from a surface of the recessed portion 57.

For example, the maintenance treatment element 22 is configured to include a bipolar electrode that receives electric energy from an energy supply device (not illustrated) serving as an external device.

In this case, electricity is supplied to the maintenance treatment element 22 disposed in the respective expansion portions 50.

The maintenance treatment element 22 and the energy supply device are connected to each other by a conducting wire (not illustrated) coated with an insulating coating material.

The conducting wire extends outward via the shaft portion 20 and the operation unit 23, and is connected to the energy supply device.

Alternatively, the maintenance treatment element 22 may be configured to serve as a monopolar electrode.

In this case, the electricity is supplied from a counter electrode plate prepared outside a body.

In addition, the maintenance treatment element 22 may be a heating element (electrode chip) that generates heat by receiving high-frequency electric energy from the energy supply device.

Furthermore, the maintenance treatment element 22 can be configured to include an energy transfer element that applies energy to the through-hole Hh, such as a heater including an electric wire which provides heating and cooling operation or generating frictional heat by using microwave energy, ultrasound energy, coherent light such as laser, a heated fluid, a cooled fluid, or a chemical medium. A specific form of the energy transfer element is not particularly limited.

The wire portion 50 can be formed of a metal material.

For example, the metal material of the wire portion 50 may be a titanium-based (Ti—Ni, Ti—Pd, or Ti—Nb—Sn) alloy, a copper-based alloy, stainless steel, β-titanium steel, or a Co—Cr alloy.

An alloy having a spring property such as a nickel titanium alloy may also be used as the material of the wire portion 50.

However, a material of the wire portion 50 is not limited, and the wire portion 50 may be formed of other materials.

The shaft portion 20 has an inner shaft 32 located inside the outer shaft 31, and the pulling shaft 33 is stored inside the inner shaft 32.

A guide wire lumen is formed in the pulling shaft 33 and the distal member 35 along the axial direction, and a guide wire 11 can be inserted into the guide wire lumen.

It is preferable that the storage sheath 30, the outer shaft 31, and the inner shaft 32 of the shaft portion 20 are formed of a material having a certain degree of flexibility.

For example, the material of the storage sheath 30, the outer shaft 31, and the inner shaft 32 can include a polyolefin such as polyethylene, polypropylene, polybutene, ethylene-propylene copolymer, ethylene-vinyl acetate copolymer, ionomer, and a mixture of the above-described two or more materials, a fluororesin such as soft polyvinyl chloride resin, polyamide, polyamide elastomer, polyester, polyester elastomer, polyurethane, and polytetrafluoroethylene, polyimide, PEEK, silicone rubber, or latex rubber.

For example, the pulling shaft 33 can an elongated wire formed of a super elastic alloy such as a nickel-titanium alloy and a copper-zinc alloy, a metal material such as stainless steel, or a resin material having relatively high rigidity is coated with a resin material such as polyvinyl chloride, polyethylene, polypropylene, and ethylene-propylene copolymer.

For example, the distal member 35 can be formed of a polymer material such as polyolefin, polyvinyl chloride, polyamide, polyamide elastomer, polyurethane, polyurethane elastomer, polyimide, and fluororesin or a mixture of polymer materials. Alternatively, the distal member 35 can be formed of a multilayer tube containing two or more polymer materials.

As illustrated in FIG. 2, the expansion body 21 exposed outward of the storage sheath 30 is brought into an expanded state in the radial direction due to a self-expanding force of the expansion body 21.

Figure 3:
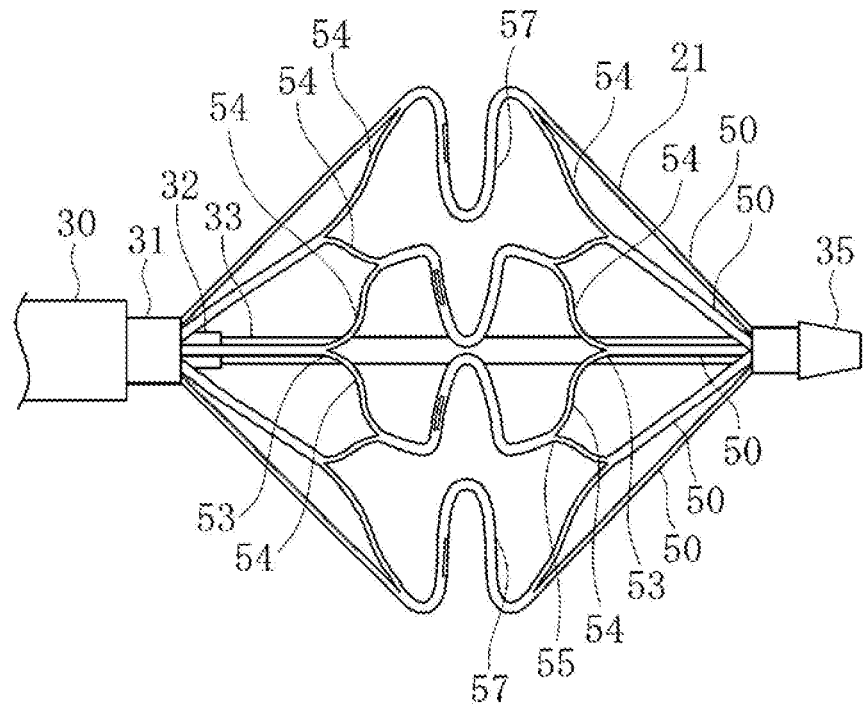
FIG. 3 is an enlarged front view illustrating the vicinity of the expansion body which expands.

As illustrated in FIG. 3, the operation unit 23 is operated, and the pulling shaft 33 is moved to the proximal side so that the distal member 35 moves to the proximal side.

In response to the movement, the expansion body 21 further expands in the radial direction.

At this time, as described above, the expansion body 21 has the bifurcated line 54 that functions as the torsion restriction portion. Accordingly, the expansion body 21 can expand without any torsion or twisting in the circumferential direction.

In this manner, the maintenance treatment element 22 can suppress positional displacement of the maintenance treatment element 22 and a decrease in a gripping force of the recessed portion 57.

In addition, the pulling shaft 33 is moved to the distal side in a state illustrated in FIG. 3. Accordingly, the expansion body 21 can return to a state illustrated in FIG. 2.

Figure 4:
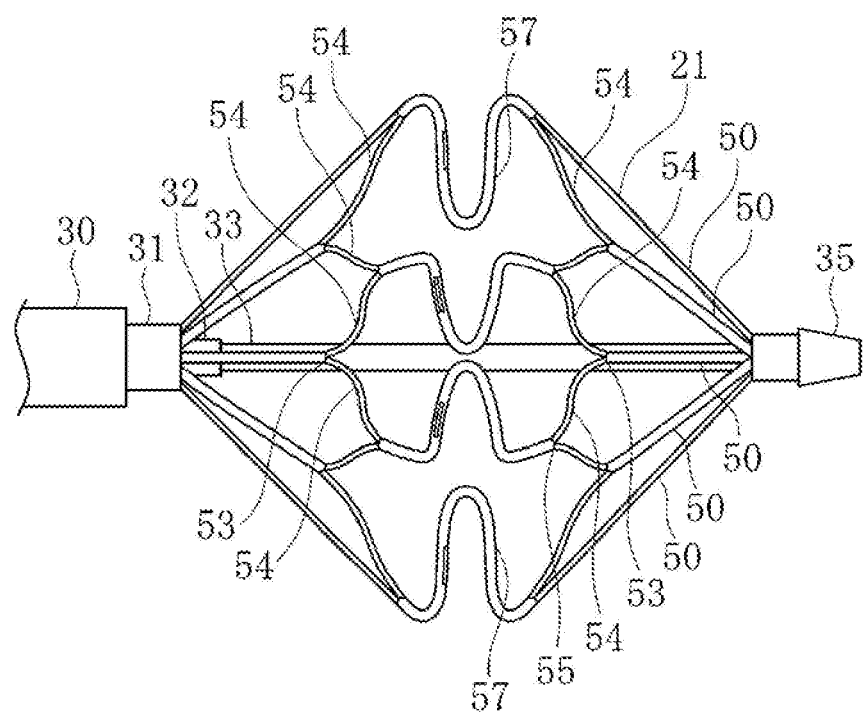
FIG. 4 is an enlarged front view illustrating the vicinity of an expansion body according to a modification example.

In addition, as a modification example of the expansion body 21, as illustrated in FIG. 4, the bifurcated line 54 may be a separate member from the wire portion 50 on the proximal side, the wire portion 50 on the distal side, and the central wire portion 56. The bifurcated line 54, the wire portion 50 on the proximal side, the wire portion 50 on the distal side, and the central wire portion 56 may be linked with each other by welding.

In this case, the bifurcated line 54 may have the thickness the same as that of the wire portion 50 on the proximal side, the wire portion 50 on the distal side, and the central wire portion 56, or may have a different thickness.

In addition, the wire portion 50 on the proximal side and the wire portion 50 on the distal side have the same thickness, but may have different thicknesses.

Treatment Method Using Medical Device of First Exemplary Embodiment

A treatment method using the medical device 10 will be described.

The treatment method according to the present embodiment is performed on a patient suffering from a heart failure (for example, a left heart failure).

Figure 6:
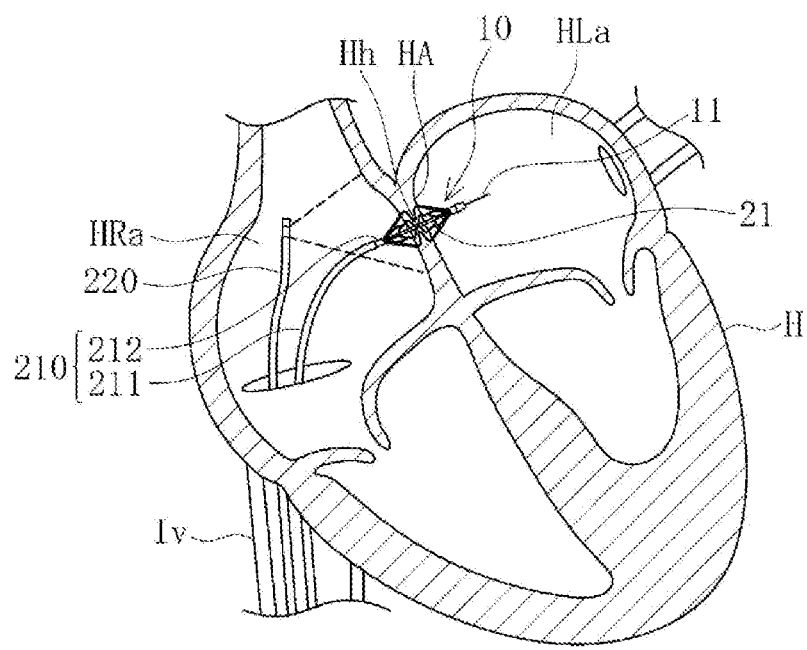
FIG. 6 is a view for describing the treatment method according to the present embodiment, and is a view for schematically describing a state where the expansion body is disposed in a through-hole of an atrial septum, in which a biological tissue is illustrated in a sectional view and the medical device is illustrated in a front view, respectively.

More specifically, as illustrated in FIG. 6, the treatment method is performed on the patient suffering from a chronic heart failure, who has high blood pressure in a left atrium HLa due to myocardial hypertrophy appearing in a left ventricle of the heart H and increased stiffness (hardness).

Figure 5:
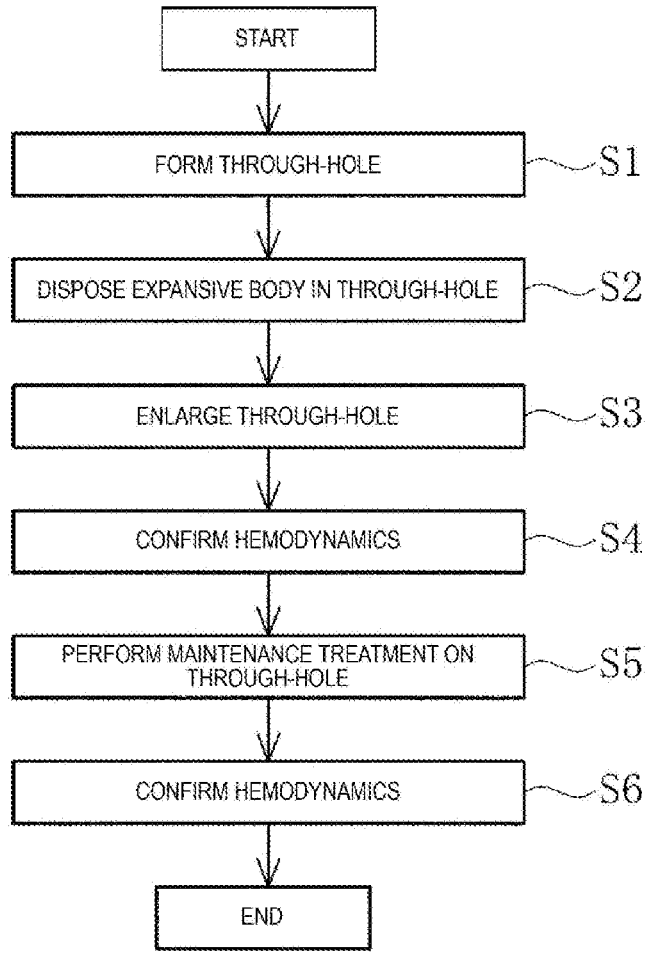
FIG. 5 is a flowchart of a treatment method using the medical device.

As illustrated in FIG. 5, the treatment method according to the present embodiment includes forming the through-hole Hh in the atrial septum HA (S1), disposing the expansion body 21 in the through-hole Hh (S2), enlarging the diameter of the through-hole Hh by using the expansion body 21 (S3), confirming hemodynamics in the vicinity of the through-hole Hh (S4), performing the maintenance treatment for maintaining the size of the through-hole Hh (S5), and confirming the hemodynamics in the vicinity of the through-hole Hh after the maintenance treatment is performed (S6).

When the through-hole Hh is formed, an operator delivers an introducer 210 in which a guiding sheath 211 and a dilator 212 are combined with each other, to the vicinity of the atrial septum HA.

For example, the introducer 210 can be delivered to a right atrium HRa via an inferior vena cava Iv.

In addition, the introducer 210 can be delivered using the guide wire 11.

The operator can insert the guide wire 11 into the dilator 212, and can deliver the introducer 210 along the guide wire 11.

The introducer 210 and the guide wire 11 can be inserted into a living body by using a known method such as using a blood vessel introducer.

In the forming of the through-hole Hh in the atrial septum HA (S1), the operator causes a puncture device (not illustrated) to penetrate from the right atrium HRa side toward the left atrium HLa side, thereby forming the through-hole Hh.

For example, a device such as a wire having a sharp distal end can be used as the puncture device.

The puncture device is inserted into the dilator 212, and is delivered to the atrial septum HA.

The puncture device can be delivered to the atrial septum HA instead of the guide wire 11 after the guide wire 11 is removed from the dilator 212.

In the disposing of the expansion body 21 in the through-hole Hh (S2), the medical device 10 is first delivered to the vicinity of the atrial septum HA along the guide wire 11 inserted in advance.

At this time, the distal portion of the medical device 10 penetrates the atrial septum HA, and reaches the left atrium HLa.

In addition, when the medical device 10 is inserted, the expansion body 21 is in a state of being stored in the storage sheath 30.

The expansion body 21 is moved to the distal side in a state where the expansion body stored in the storage sheath 30 is located in the vicinity of the atrial septum HA, so that a distal side portion of the expansion body 21 is exposed inside the left atrium HLa.

In the manner, the distal side portion from the recessed portion 57 in the expansion body 21 expands in the radial direction.

Here, a distal side surface of the recessed portion 57 is pressed against a surface on the left atrium HLa side of the atrial septum HA.

In this manner, the expansion body 21 is positioned against the surface of the surface on the left atrium HLa side of the atrial septum HA.

Next, as illustrated in FIG. 6, the storage sheath 30 is moved to the proximal side so that the whole expansion body 21 is exposed.

In the manner, the proximal side portion in the expansion body 21 expands in the radial direction inside the right atrium HRa, and the atrial septum HA is gripped (i.e., pinched) by the recessed portion 57.

In the enlarging of the diameter of the through-hole Hh by using the expansion body 21 (S3), the operator operates the operation unit 23 in a state where the atrial septum HA is gripped by the recessed portion 57. In this manner, the pulling shaft 33 is moved to the proximal side.

In this manner, the expansion body 21 further expands in the radial direction to widen the gripped through-hole Hh in the radial direction.

After the through-hole Hh is enlarged, the hemodynamics in the vicinity of the through-hole are confirmed (S4).

As illustrated in FIG. 6, the operator delivers a hemodynamics confirming device 220 to the right atrium HRa by way of the inferior vena cava Iv.

For example, a known echo catheter can be used as the hemodynamics confirming device 220.

The operator can display an echo image acquired by the hemodynamics confirming device 220 on a display apparatus such as a display, and can confirm a blood volume passing through the through-hole Hh, based on a result of the echo image.

Next, the operator performs the maintenance treatment for maintaining the size of the through-hole Hh (S5).

In the maintenance treatment, high-frequency energy is applied to an edge portion of the through-hole Hh through the maintenance treatment element 22, thereby cauterizing (heating and cauterizing) the edge portion of the through-hole Hh by using the high-frequency energy.

When the biological tissue in the vicinity of the edge portion of the through-hole Hh is cauterized through the maintenance treatment element 22, a degenerated portion having the degenerated biological tissue is formed in the vicinity of the edge portion.

The biological tissue in the degenerated portion is in a state where elasticity is lost. Accordingly, the through-hole Hh can maintain a shape widened by the expansion body 21.

In a state where the recessed portion 57 having the maintenance treatment element 22 grips the atrial septum HA as described above, the maintenance treatment is performed.

Therefore, when the maintenance treatment is performed, the positional displacement of the maintenance treatment element 22 can be prevented.

The maintenance treatment element 22 is disposed to protrude from a surface of the recessed portion 57.

Therefore, the recessed portion 57 is pressed against the atrial septum HA. In this manner, the maintenance treatment is performed in a state where the maintenance treatment element 22 is incorporated in the biological tissue.

In this manner, the maintenance treatment element 22 may be prevented from coming into contact with the blood during the maintenance treatment. Accordingly, the appearance of a thrombus caused by a current leaking into the blood can be suppressed.

After the maintenance treatment is performed, the hemodynamics in the vicinity of the through-hole Hh are confirmed again (S6). In a case where the blood volume passing through the through-hole Hh reaches a desired volume, the operator decreases the diameter of the expansion body 21. After the expansion body 21 is stored in the storage sheath 30, the expansion body 21 is removed from the through-hole Hh.

Furthermore, the whole medical device 10 is removed outward of the living body, and the treatment is completed.

Second Exemplary Embodiment of Expansion Body

Next, an expansion body 60 according to a second exemplary embodiment will be described.

The expansion body 60 is used for the medical device 10 described above.

An overall configuration of the medical device 10 is the same as that of the medical device 10 described above except for the expansion body 60, and thus, description of the overall configuration of the medical device 10 will be omitted.

Figure 7:
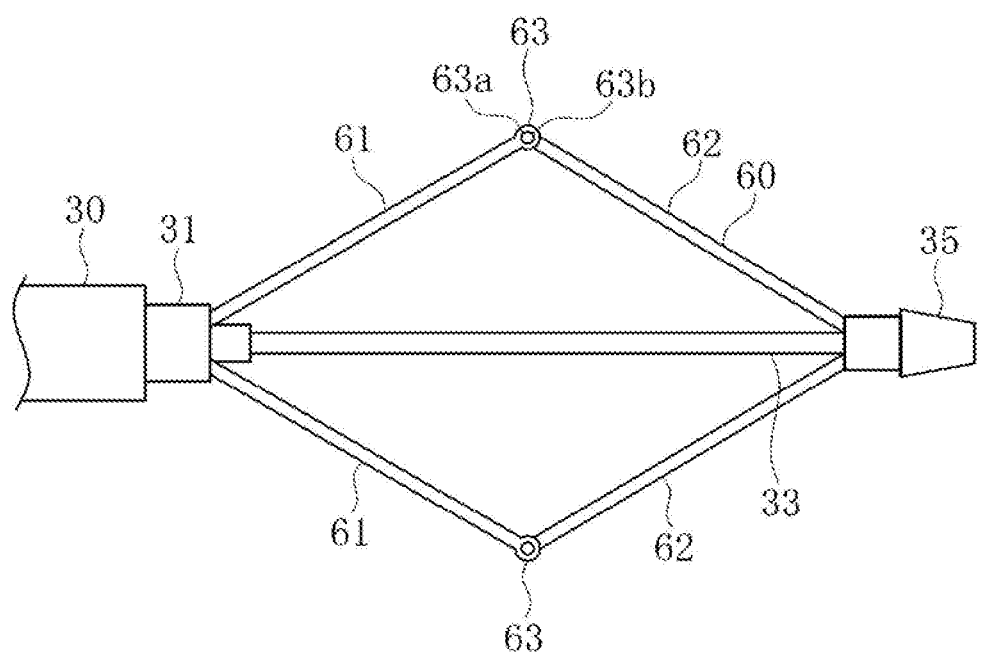
FIG. 7 is an enlarged front view illustrating the vicinity of an expansion body according to a second exemplary embodiment.

As illustrated in FIG. 7, the expansion body 60 has a proximal side wire portion 61 and the distal side wire portion 62, which are linked with each other by a hinge portion 63.

The hinge portion 63 is formed by combining a rotating shaft portion 63a disposed in the distal side wire portion 62 and a receiving portion 63b disposed in the proximal side wire portion 61 with each other.

The hinge portion 63 links the proximal side wire portion 61 and the distal side wire portion 62 with each other to be pivotable.

Figure 8:
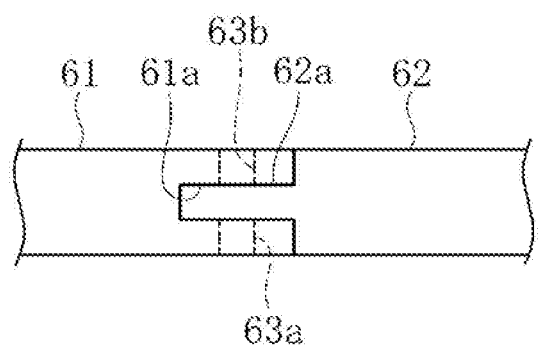
FIG. 8 is an enlarged plan view illustrating the vicinity of a link portion of a wire portion.

As illustrated in FIG. 8, the distal side wire portion 62 has a projection portion 62a in the proximal portion of the distal side wire portion 62.

The rotating shaft portion 63a is disposed to extend outward from both sides of the projection portion 62a.

The proximal side wire portion 61 has a recess portion 61a for storing the projection portion 62a.

The recess portion 61a has a receiving portion 63b that receives the rotating shaft portion 63a to be rotatable.

The projection portion 62a of the distal side wire portion 62 and the recess portion 61a of the proximal side wire portion 61 are attached to each other in the circumferential direction of the expansion body 60.

In this manner, the proximal side wire portion 61 and the distal side wire portion 62 are restricted in moving relative to each other in the circumferential direction. Therefore, it is possible to suppress torsion of the expansion body 60 in the circumferential direction.

That is, the hinge portion 63 functions as the torsion restriction portion of the expansion body 60.

Figure 9:
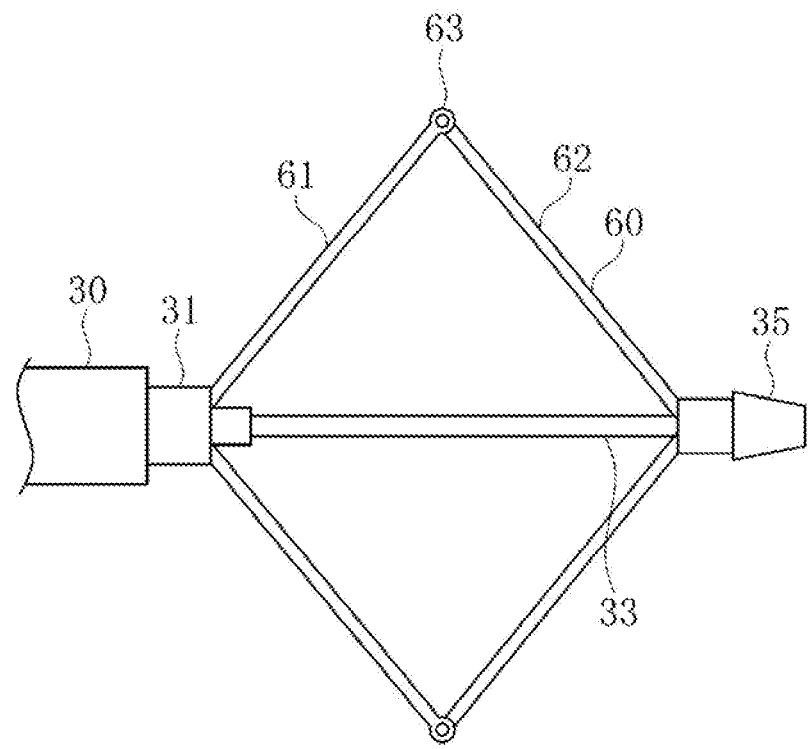
FIG. 9 is an enlarged front view illustrating the vicinity of the expansion body which expands.

As illustrated in FIG. 9, the operation unit 23 is operated to move the pulling shaft 33 to the proximal side. In this manner, the hinge portion 63 pivots, and the expansion body 60 expands in the radial direction.

In this manner, the through-hole Hh of the atrial septum HA can be enlarged.

In this example, the receiving portion 63b is disposed in the proximal side wire portion 61, and the rotating shaft portion 63a is disposed in the distal side wire portion 62, respectively. However, the rotating shaft portion 63a may be disposed in the proximal side wire portion 61, and the receiving portion 63b may be disposed in the distal side wire portion 62, respectively.

In addition, in this example, the recess portion 61a is disposed in the proximal side wire portion 61, and the projection portion 62a is disposed in the distal side wire portion 62. However, the projection portion may be disposed in the proximal side wire portion 61, and the recess portion may be disposed in the distal side wire portion 62, respectively.

A modification example of the expansion body having the hinge portion will be described.

Figure 10:
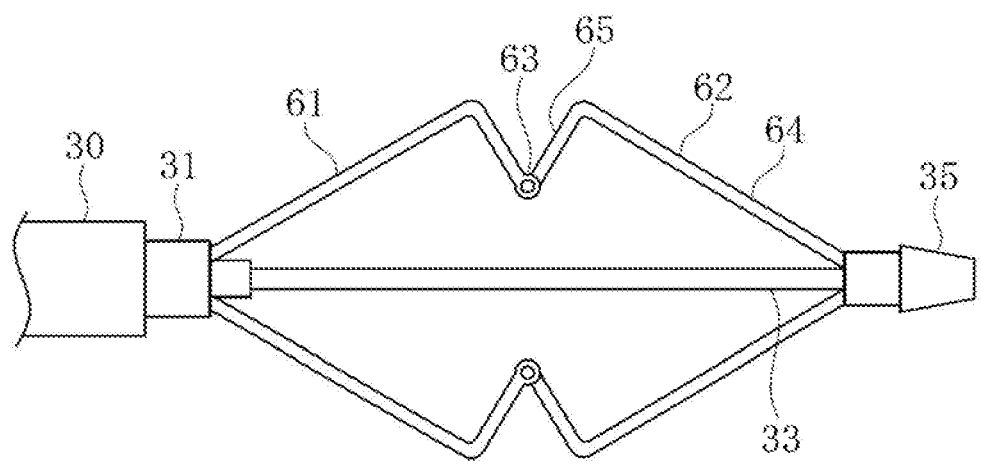
FIG. 10 is an enlarged front view illustrating the vicinity of an expansion body according to a first modification example in the second exemplary embodiment.

As illustrated in FIG. 10, the expansion body 64 may have a recessed portion 65 formed by the proximal side wire portion 61 and the distal side wire portion 62.

In this case, an edge portion of the recessed portion 65 has an elastically deformable shape which is thinner than the other portions, and the hinge portion 63 is disposed in a bottom portion of the recessed portion 65.

Figure 11:
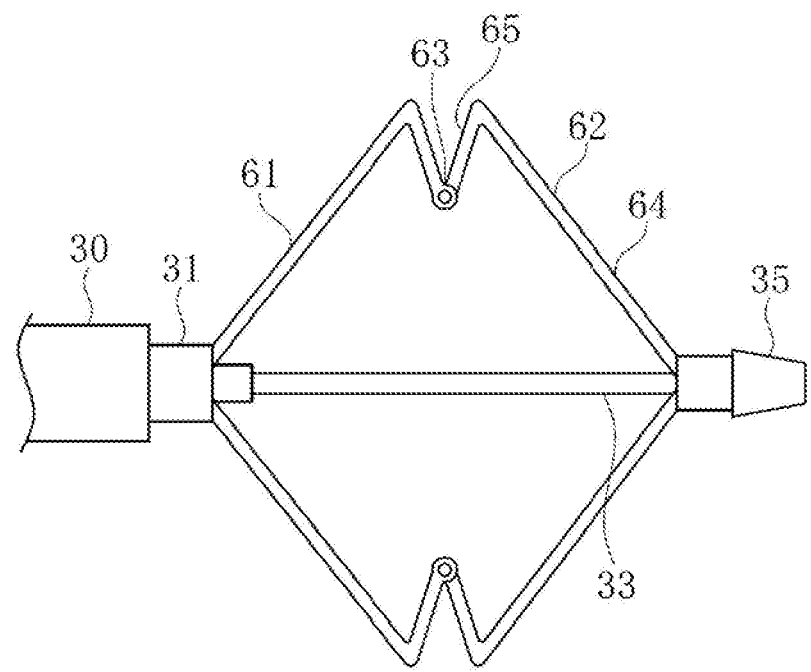
FIG. 11 is an enlarged front view illustrating a state where the expansion body according to the first modification example expands.

As illustrated in FIG. 11, the expansion body 64 expands. Accordingly, in the recessed portion 65, the hinge portion 63 pivots to grip the atrial septum HA, and elastically deforms so that an angle of an edge portion further decreases.

In this manner, the width of the recessed portion 65 is narrowed, and the force of gripping the biological tissue can be increased.

Figure 12:
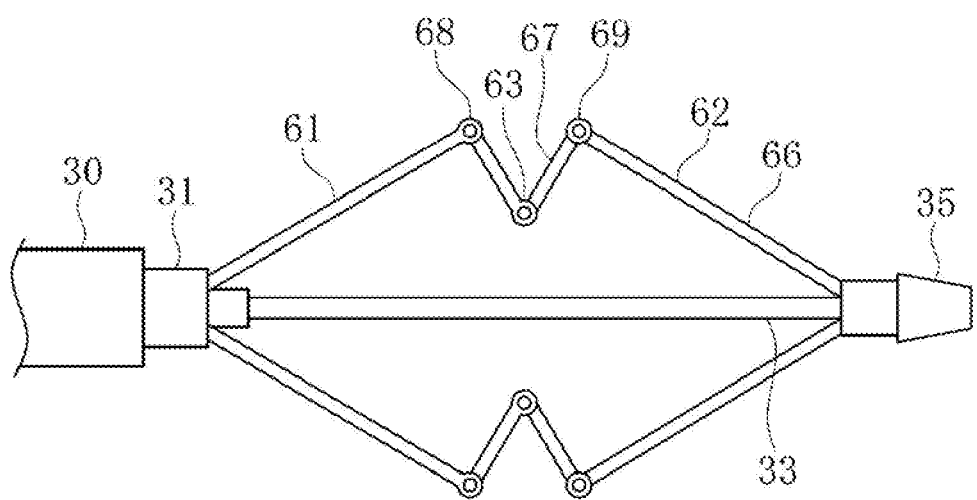
FIG. 12 is an enlarged front view illustrating the vicinity of an expansion body according to a second modification example.

As illustrated in FIG. 12, the expansion body 66 may have three hinge portions.

In this case, the recessed portion 67 is formed by the proximal side wire portion 61 and the distal side wire portion 62.

The hinge portion 63 is disposed in the bottom portion of the recessed portion 67.

In addition, a second hinge portion 68 and a third hinge portion 69 are respectively disposed on both sides of the recessed portion 67.

Figure 13:
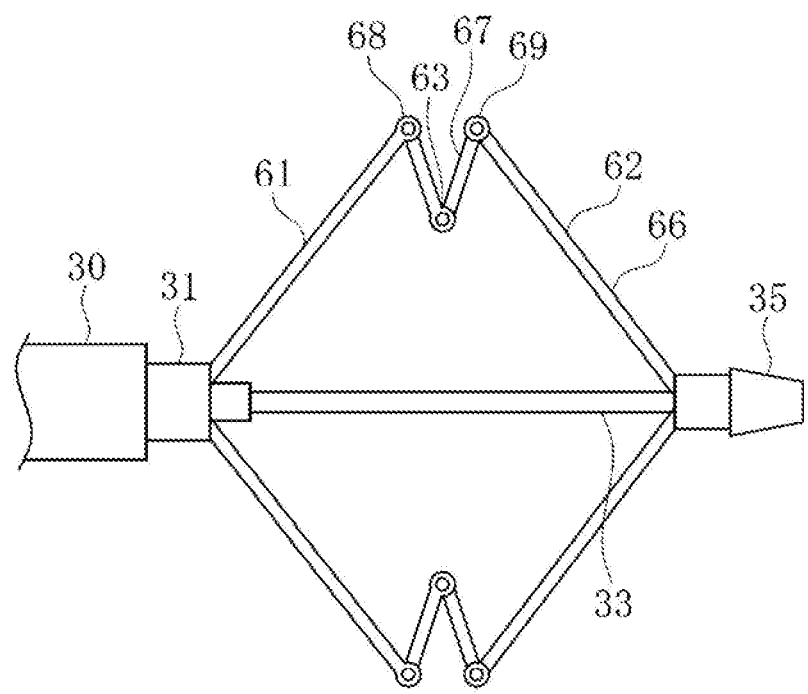
FIG. 13 is an enlarged front view illustrating a state where the expansion body according to the second modification example expands.

In this manner, as illustrated in FIG. 13, when the pulling shaft 33 is moved to the proximal side, the hinge portion 63, the second hinge portion 68, and the third hinge portion 69 respectively pivot to increase the diameter of the expansion body 66. The width of the recessed portion 67 is narrowed so that the force of gripping the biological tissue can be increased.

In addition, a plurality of the hinge portions are provided. Accordingly, a restriction force in the circumferential direction of the proximal side wire portion 61 and the distal side wire portion 62 can be increased, and it is possible to further suppress the torsion of the expansion body 66.

Third Embodiment of Expansion Body

Next, an expansion body 70 according to a third exemplary embodiment will be described.

The expansion body 70 is used for the medical device 10 described above.

An overall configuration of the medical device 10 is the same as that of the medical device 10 described above except for the expansion body 70, and thus, description of the overall configuration of the medical device 10 will be omitted.

Figure 14:
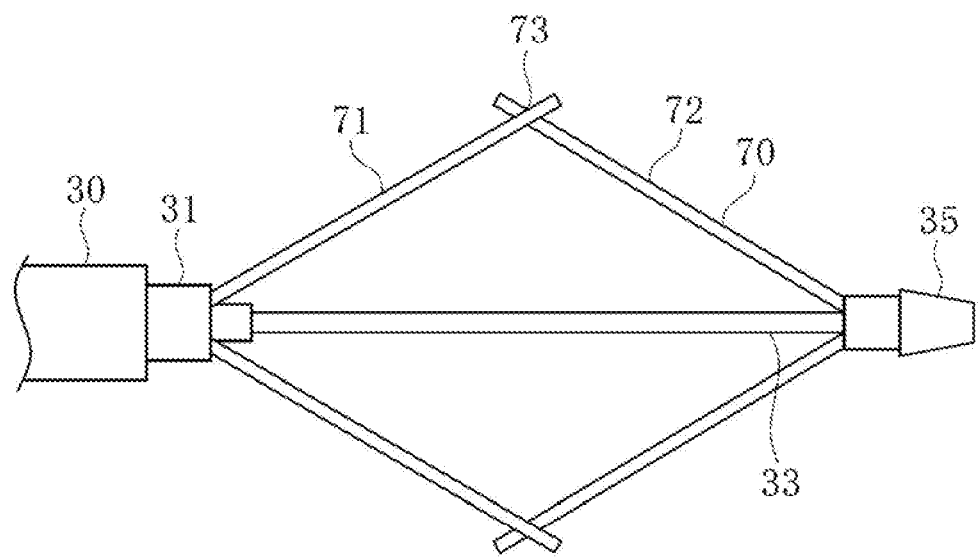
FIG. 14 is an enlarged front view illustrating the vicinity of an expansion body according to a third embodiment.

As illustrated in FIG. 14, the expansion body 70 has a proximal side wire portion 71 and a distal side wire portion 72.

The central portion of the expansion body 70 has a fitting portion 73 in which the proximal side wire portion 71 and the distal side wire portion 72 are linked to support each other.

Figure 15A:
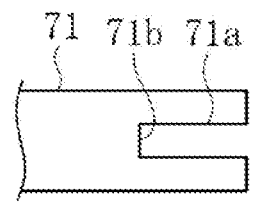
FIG. 15A illustrates an enlarged plan view illustrating the vicinity of a distal end of a proximal side wire portion forming the expansion body.

As illustrated in FIG. 15A, the proximal side wire portion 71 has a recess portion 71a which serves as an insertion portion in the distal portion.

The recess portion 71a has a linear bottom edge portion 71b.

Figure 15B:
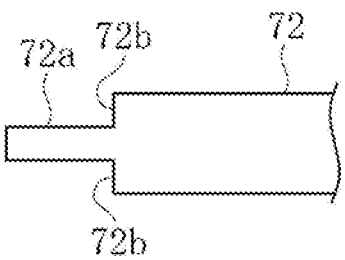
FIG. 15B illustrates an enlarged plan view illustrating the vicinity of a proximal end of a distal side wire portion.

In addition, as illustrated in FIG. 15B, the distal side wire portion 72 has a projection portion 72a in the distal portion.

Both side linear edge portions 72b are formed adjacent to the distal end of the projection portion 72a.

Figure 15C:
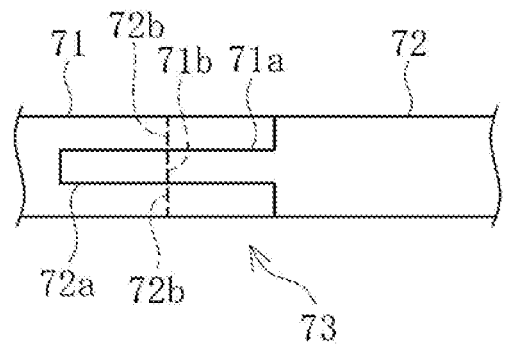
FIG. 15C illustrates an enlarged plan view illustrating a portion in which both of these are combined with each other.

As illustrated in FIG. 15C, the projection portion 72a of the distal side wire portion 72 is inserted into the recess portion 71a of the proximal side wire portion 71. In this manner, the bottom edge portion 71b of the proximal side wire portion 71 and the distal side wire portion 72 are attached to each other, and the proximal side wire portion 71 and the both side edge portions 72b of the distal side wire portion 72 are attached to each other.

The recess portion 71a and the projection portion 72a are fitted together, thereby forming the fitting portion 73 in which the proximal side wire portion 71 and the distal side wire portion 72 are linked to support each other.

The projection portion 72a has the width substantially the same as that of the recess portion 71a. Accordingly, the proximal side wire portion 71 and the distal side wire portion 72 are attached to each other in the circumferential direction of the expansion body 70. In this manner, both of these are restricted in moving in the circumferential direction.

That is, the fitting portion 73 functions as the torsion restriction portion that restricts the movement of the proximal side wire portion 71 and the distal side wire portion 72 in the circumferential direction of the expansion body 70.

Figure 16:
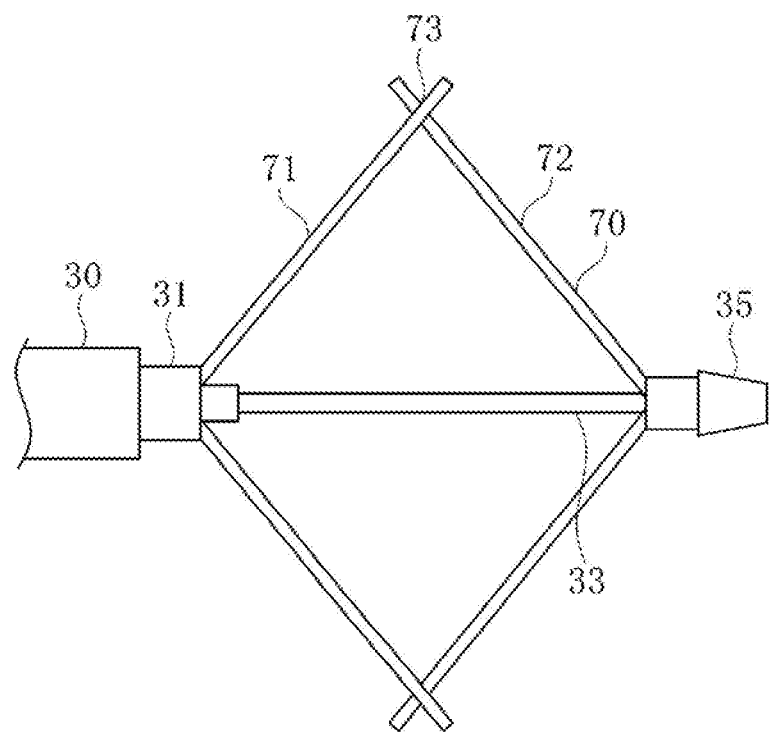
FIG. 16 is an enlarged front view illustrating the vicinity of the expansion body which expands.

As illustrated in FIG. 16, the expansion body 70 expands by operating the operation unit 23 to move the pulling shaft 33 to the proximal side.

The proximal side wire portion 71 and the distal side wire portion 72 support each other in a fitting element, and are not fixed to each other. Accordingly, the diameter of the expansion body 70 can be increased while an angle formed between proximal side wire portion 71 and the distal side wire portion 72 may be changed.

The angle formed between the distal portion of the proximal side wire portion 71 and the distal portion of the distal side wire portion 72 decreases due to the expansion of the expansion body 70.

Therefore, the atrial septum HA can be gripped by the angle formed between the distal portion of the proximal side wire portion 71 and the distal portion of the distal side wire portion 72.

In the expansion body 70, the proximal side wire portion 71 has the recess portion 71a, and the distal side wire portion 72 has the projection portion 72a, respectively. However, the distal side wire portion 72 may have the recess portion, and the proximal side wire portion 71 may have the projection portion, respectively.

In addition, in a form of the expansion body 70 illustrated in FIG. 14, a shape other than the recess portion 71a and the projection portion 72a can be adopted as a shape in which the proximal side wire portion 71 and the distal side wire portion 72 are linked with each other.

Figure 17:
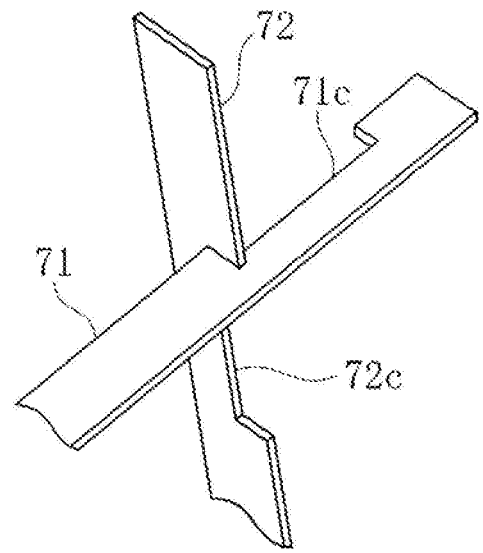
FIG. 17 is an enlarged perspective view illustrating the vicinity of a linking portion of a wire portion in a case where a fitting portion is configured to include a cutout portion.

As illustrated in FIG. 17, the proximal side wire portion 71 and the distal side wire portion 72 may respectively have cutout portions 71c and 72c, and both of these may be fitted together.

Figure 18:
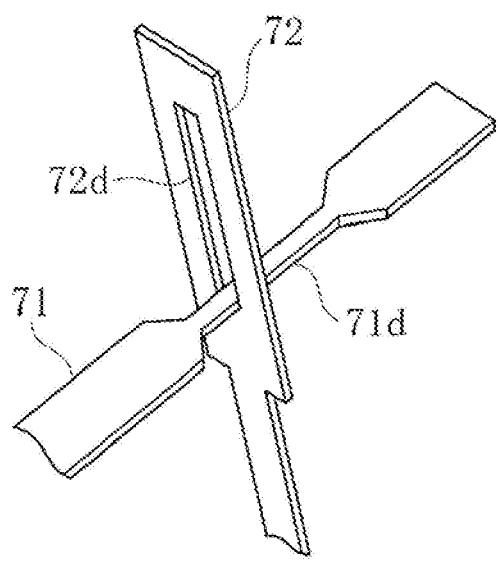
FIG. 18 is an enlarged perspective view illustrating the vicinity of the linking portion of the wire portion in a case where the fitting portion is configured to include a slit hole and a thin portion.

In addition, as illustrated in FIG. 18, the proximal side wire portion 71 may have a thin portion 71d. The distal side wire portion 72 may have an insertion portion 72d formed using a slit hole, and the thin portion 71d may be inserted into the insertion portion 72d.

In accordance with an alternative embodiment, the distal side wire portion 72 may have the thin portion, and the proximal side wire portion 71 may have the insertion portion.

A modification example of the expansion body having the fitting portion will be described.

Figure 19:
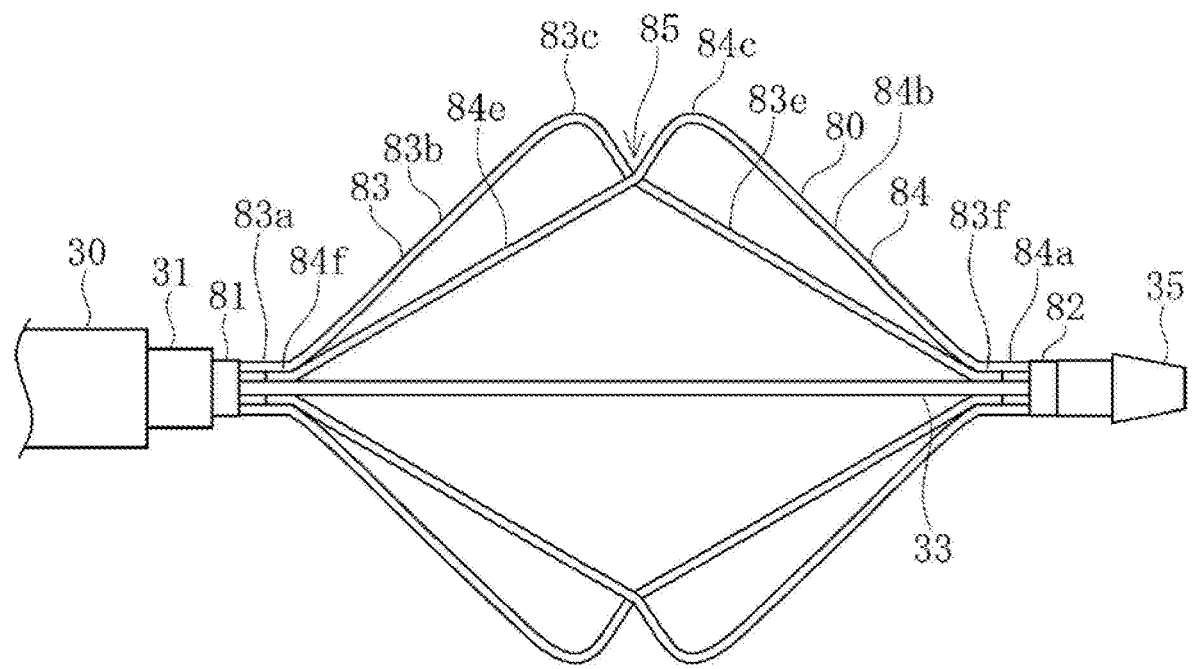
FIG. 19 is an enlarged front view illustrating the vicinity of an expansion body according to a first modification example in a third exemplary embodiment.

As illustrated in FIG. 19, an expansion body 80 has a proximal side wire portion 83 and a distal side wire portion 84.

In the proximal side wire portion 83, a link portion 83a of the proximal end is fixed to a proximal portion 81 of the expansion body 80, and in the distal side wire portion 84, a link portion 84a of the distal end is fixed to a distal portion 82 of the expansion body 80, respectively.

The proximal side wire portion 83 has a large-diameter portion 83b inclined so that the diameter increases from the link portion 83a toward the distal side in the radial direction of the expansion body 80, a bending portion 83c bent inward in the radial direction of the expansion body 80, an extension portion 83e extending toward the distal side from a portion intersecting the distal side wire portion 84, and a fixed portion 83f fixed by being attached to the link portion 84a of the distal side wire portion 84.

The distal side wire portion 84 has a shape obtained by inverting the proximal side wire portion 83, and has a large-diameter portion 84b, a bending portion 84c, an extension portion 84e, and a fixed portion 84f.

Figure 20:
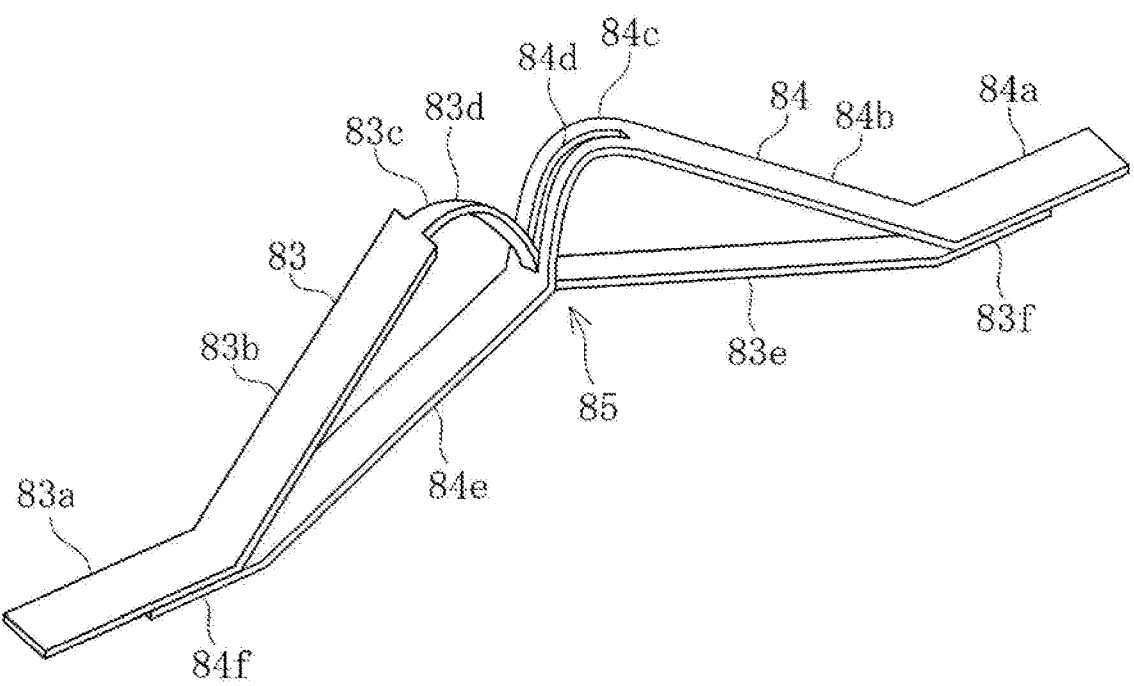
FIG. 20 is a perspective view illustrating a wire portion forming the expansion body according to the first modification example.

As illustrated in FIG. 20, the distal side wire portion 84 has an insertion portion 84d formed using a slit hole in the bending portion 84c, and the proximal side wire portion 83 has a thin portion 83d inserted into an insertion portion 84d.

The proximal side wire portion 83 supports the distal side wire portion 84 in an end portion of the extension portion 83e, and the distal side wire portion 84 supports the proximal side wire portion 83 in an end portion of the insertion portion 84d.

In this way, an intersection portion between the proximal side wire portion 83 and the distal side wire portion 84 has a fitting portion 85 in which both of the proximal side wire portion 83 and the distal side wire portion 84 support each other.

The width of the thin portion 83d is substantially the same as the width of the insertion portion 84d. Accordingly, the proximal side wire portion 83 and the distal side wire portion 84 are restricted in moving relative to each other in the circumferential direction of the expansion body 80.

That is, the fitting portion 85 functions as the torsion restriction portion that restricts the movement of the proximal side wire portion 83 and the distal side wire portion 84 in the circumferential direction of the expansion body 80.

In a case where the proximal side wire portion 83 and the distal side wire portion 84 are extended, the thin portion 83d is stored inside the insertion portion 84d. Accordingly, both of proximal side wire portion 83 and the distal side wire portion 84 can have a linear shape without interfering with each other.

In this manner, the expansion body 80 can be stored inside the storage sheath 30.

Figure 21:
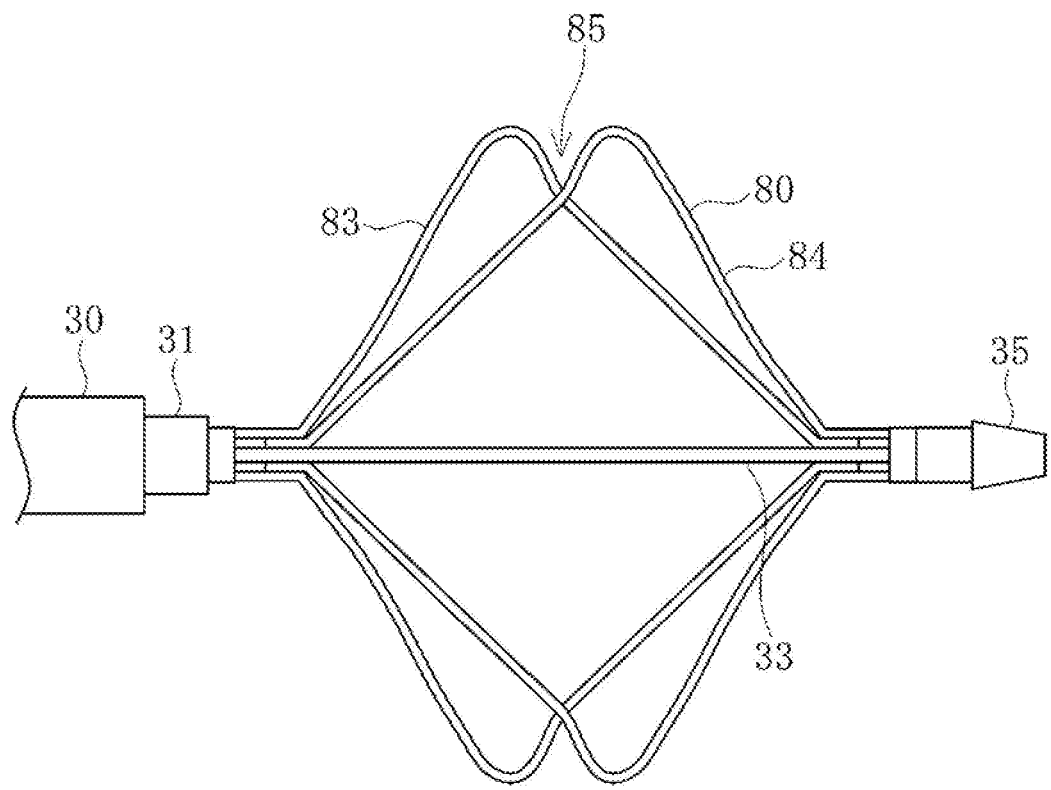
FIG. 21 is an enlarged front view illustrating a state where the expansion body according to the first modification example expands.

As illustrated in FIG. 21, the pulling shaft 33 is moved to the proximal side. Accordingly, the proximal side wire portion 83 and the distal side wire portion 84 which support each other can deform in a diameter increasing direction, and the diameter of the expansion body 80 can be increased.

In this case, the torsion of the expansion body 80 in the circumferential direction is suppressed by the fitting portion 85 serving as the torsion restriction portion.

In the expansion body 80, the proximal side wire portion 83 has the thin portion 83d, and the distal side wire portion 84 has the insertion portion 84d, respectively. However, the distal side wire portion 84 may have thin portion, and the proximal side wire portion 83 may have the insertion portion, respectively.

An expansion body 90 according to still another modification example will be described.

Figure 22:
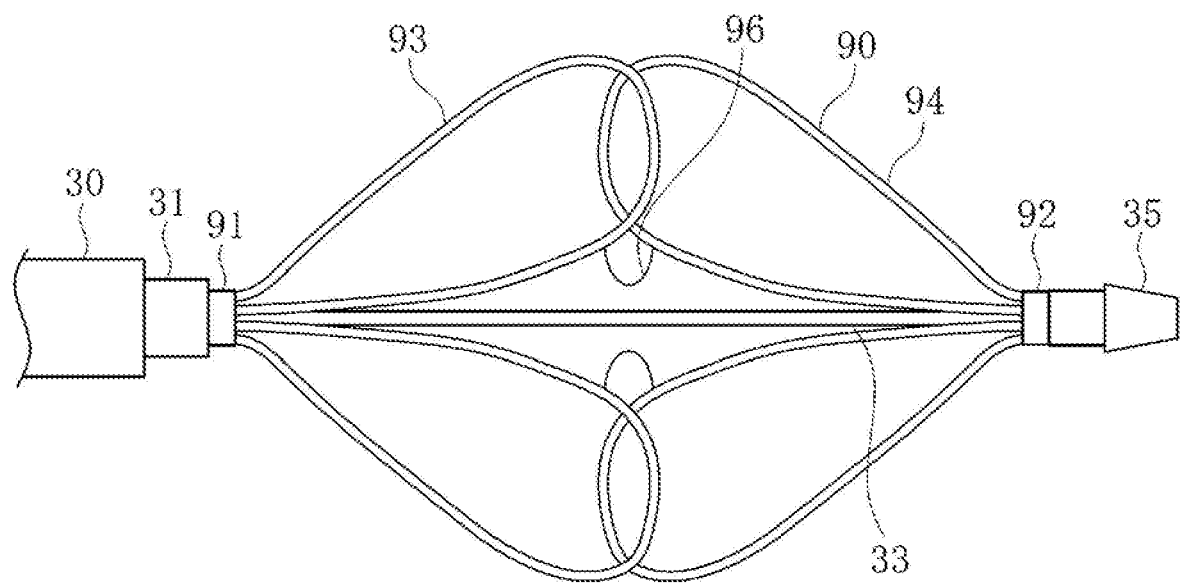
FIG. 22 is an enlarged front view illustrating the vicinity of an expansion body according to a second modification example.

As illustrated in FIG. 22, the expansion body 90 has a proximal side wire portion 93 and a distal side wire portion 94 which respectively have a loop shape.

The proximal side wire portion 93 is fixed to a proximal portion 91 of the expansion body 90, and the distal side wire portion 94 is fixed to a distal portion 92 of the expansion body 90, respectively.

The proximal side wire portion 93 and the distal side wire portion 94 are linked with each other by a link portion 96 such as a wire.

The link portion 96 is provided to maintain a positional relationship between the proximal side wire portion 93 and the distal side wire portion 94 when the expansion body 90 is stored in the storage sheath 30.

Figure 23A:
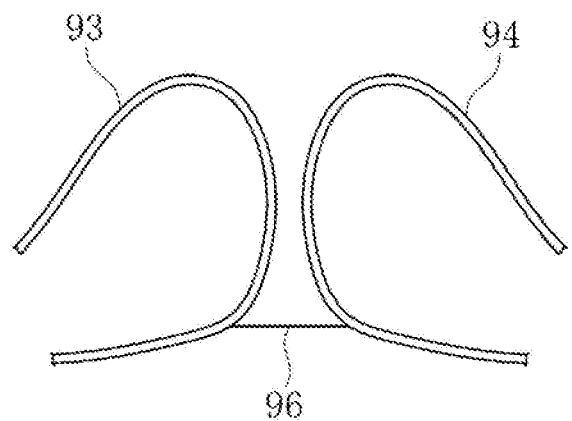
FIGS. 23A and 23B are enlarged front views illustrating a state before linkage and a state after linkage of the expansion body, respectively, according to the second modification example.

As illustrated in FIG. 23A, the proximal side wire portion 93 and the distal side wire portion 94 are linked with by the link portion 96, and both of the proximal side wire portion 93 and the distal side wire portion 94 are not directly fixed to each other.

Figure 23B:
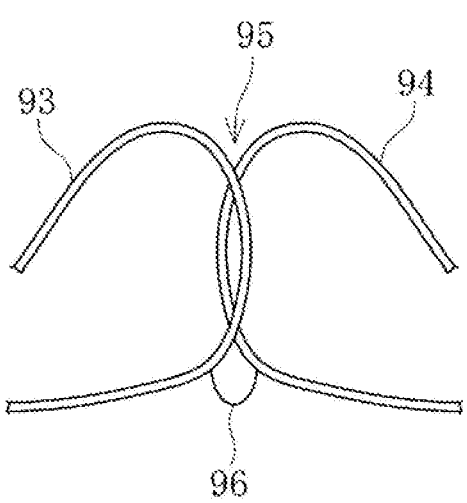

As illustrated in FIG. 23B, the proximal side wire portion 93 and the distal side wire portion 94 move close to each other to intersect each other. In this manner, both of the proximal side wire portion 93 and the distal side wire portion 94 are in a state of supporting each other.

Figure 24:
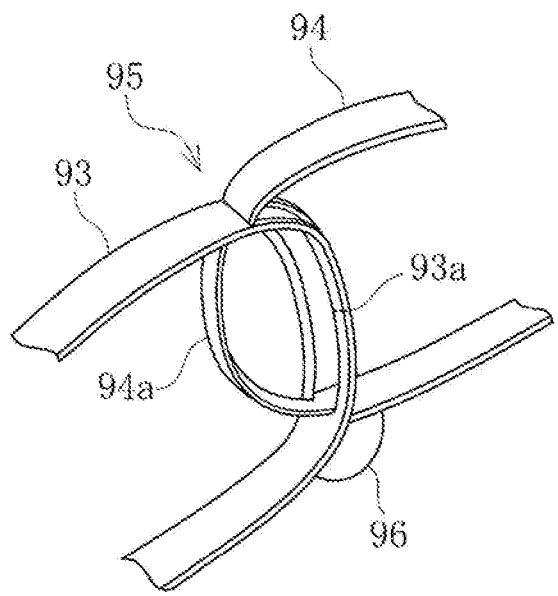
FIG. 24 is an enlarged perspective view illustrating the vicinity of a linking portion of the expansion body according to the second modification example.

As illustrated in FIG. 24, the proximal side wire portion 93 has an insertion portion 93a formed using a slit hole, and the distal side wire portion 94 has a thin portion 94a inserted into an insertion portion 93a.

The thin portion 94a can be inserted into the insertion portion 93a, and both of the thin portion 94a and the insertion portion 93a form a fitting portion 95.

The insertion portion 93a and the thin portion 94a are fitted together. Accordingly, the proximal side wire portion 93 and the distal side wire portion 94 support each other.

In the fitting portion 95, both sides of the thin portion 94a are attached to the insertion portion 93a. Accordingly, the proximal side wire portion 93 and the distal side wire portion 94 are attached to each other in the fitting portion 95 in the circumferential direction.

In this manner, the fitting portion 95 can function as the torsion restriction portion.

As described above, according to the above-described embodiment, the medical device 10 is disclosed, which enlarges the biological tissue. The medical device 10 includes the elongated shaft portion 20, and the expansion body 21 disposed in the distal portion of the shaft portion 20, and configured to expand and contract in the radial direction. The expansion body 21 has the wire portion 50 linked with the shaft portion 20, and the torsion restriction portion that restricts the movement of the wire portion 50 in the circumferential direction.

In this manner, it is possible to suppress the torsion of the expansion body 21 when the expansion body 21 formed using the wire expands in the circumferential direction.

In addition, when a plurality of the wire portions 50 are disposed in the circumferential direction and the torsion restriction portion is configured so that the wire portions 50 adjacent to each other in the circumferential direction of the expansion body 21 are connected to each other, since the wire portions 50 are connected to each other in the circumferential direction, it is possible to reliably suppress the torsion of the expansion body 21.

In addition, when the wire portion 50 has the bifurcated portion 53 bifurcated into the two bifurcated lines 54 and the bifurcated line 54 bifurcated from one of the wire portions 50 merges with the bifurcated line 53 bifurcated from the adjacent wire portion 50, a force may be rather easily transmitted in the axial direction, and it is possible to achieve the expansion body 21 which can suppress the torsion in the circumferential direction.

In addition, when the proximal side and the distal side of the expansion body 21 respectively have the bifurcated lines 54 and the central wire portions 56 where the bifurcated lines 54 merge with each other are respectively disposed on both sides in the length direction between the bifurcated lines 54 on the proximal side and the distal side, it is possible to suppress the torsion in the circumferential direction on both sides of the central portion of the expansion body 21 that transmits the expansion force to the biological tissue.

In addition, when the central wire portion 56 has the recessed portion 57 recessed in the direction orthogonal to the axial direction of the expansion body 21, when the expansion body 21 expands, the biological tissue can be rather easily gripped by the recessed portion 57.

In addition, when the torsion restriction portion links the proximal side wire portion 61 and the distal side wire portion 62 with each other and the linked wire portions 61 and 62 are attached to each other in the circumferential direction, the wire portions 61 and 62 support each other in the circumferential direction. Accordingly, the torsion or twisting of the wires of the expansion body 60 can be suppressed.

In addition, when the torsion restriction portion has the rotating shaft portion 63a disposed in one of the wire portions 62 and the receiving portion 63b disposed in the other of the wire portions 61 and receiving the rotating shaft portion 63a to be rotatable, the proximal side wire portion 61 and the distal side wire portion 62 can freely pivot relative to each other. Accordingly, the expansion body 60 rather easily expands in the radial direction, and the mutual movement in the circumferential direction is restricted in a rotating portion.

In addition, when the expansion body 64 has the recessed portion 65 in the intermediate portion in the axial direction and the torsion restriction portion is disposed in at least the bottom portion of the recessed portion 65, the recessed portion 65 is likely to deform. Accordingly, the biological tissue is gripped by the recessed portion 65, and it is possible to suppress the positional displacement of the expansion body 64.

In addition, when the torsion restriction portion is the fitting portion 73 in which the proximal side wire portion 71 and the distal side wire portion 72 are linked to support each other, the wire portions 71 and 72 support each other so that the torsion in the circumferential direction can be suppressed.

In addition, when one of the proximal side wire portion 83 and the distal side wire portion 84 has the insertion portion 84d formed using the slit hole or the cutout portion into which the other wire portion 83 is inserted and the other wire portion 83 is supported by the end portion of the insertion portion 84d, the wire portions 83 and 84 intersect and support each other in the axial direction of the expansion body 80. Accordingly, the torsion in the circumferential direction can be suppressed in an intersection portion.

In addition, when the wire portion 50 has the maintenance treatment element 22 that performs the maintenance treatment on the biological tissue, the expansion body 21 can expand without any torsion. Accordingly, the maintenance treatment element 22 can be reliably brought into pressing contact with the biological tissue, and the energy can be accurately applied to the target site of the biological tissue.

The present disclosure is not limited to the above-described embodiments, and various modifications can be made by those skilled in the art within the technical idea of the present disclosure.

The detailed description above describes embodiments of a medical device including a maintenance treatment element configured to apply energy to a biological tissue, and a treatment method configured to apply energy to a biological tissue. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A medical device configured to enlarge a through-hole of an atrial septum, the medical device comprising:
   an elongated shaft portion;
   an expansion body disposed in a distal portion of the elongated shaft portion, the expansion body configured to expand and contract in a radial direction;
   wherein the expansion body has a wire portion linked with the elongated shaft portion, and a torsion restriction portion configured to restrict movement of the wire portion in a circumferential direction;
   wherein the wire portion includes a plurality of wire portions disposed in the circumferential direction, and the torsion restriction portion connects adjacent wire portions of the plurality of wire portions to each other in the circumferential direction of the expansion body;
   wherein the plurality of wire portions form a proximal side portion, a distal side portion, and a central portion of the expansion body, the central portion being between the proximal side portion and the distal side portion;
   wherein the central portion includes a recessed portion that has a recessed shape in a direction orthogonal to an axial direction of the expansion body;
   wherein the plurality of wire portions forming the proximal side portion of the expansion body include a plurality of proximal bifurcated portions and a plurality of proximal merging portions disposed between the plurality of proximal bifurcated portions and the central portion of the expansion body, each of the plurality of proximal bifurcated portions dividing one of the plurality of wire portions into a first proximal bifurcated line and a second proximal bifurcated line, each of the plurality of proximal merging portions merging the first proximal bifurcated line bifurcated from one of the plurality of proximal bifurcated portions with the second proximal bifurcated line bifurcated from an adjacent one of the plurality of proximal bifurcated portions so as to serve as a proximal torsion restriction portion;
wherein the plurality of wire portions forming the distal side portion of the expansion body include a plurality of distal bifurcated portions and a plurality of distal merging portions disposed between plurality of distal bifurcated portions and the central portion of the expansion body, each of the plurality of distal bifurcated portions dividing one of the plurality of wire portions into a first distal bifurcated line and a second distal bifurcated line, each of the plurality of distal merging portions merging the first distal bifurcated line bifurcated from one of the plurality of distal bifurcated portions with the second distal bifurcated line bifurcated from an adjacent one of the plurality of distal bifurcated portions so as to serve as a distal torsion restriction portion;
wherein the plurality of wire portions forming the central portion of the expansion body include a plurality of proximal connecting portions and a plurality of distal connecting portions, each of the plurality of distal connecting portions connected with only one of the plurality of distal merging portions so as to form a single line independent of each other extending in a distal direction with a curved shape outwardly convex in the radial direction;
wherein the recessed portion is connected with the plurality of wire portions forming the distal side portion of the expansion body via a plurality of the single lines independent of each other, and is connected with the plurality of wire portions forming the proximal side portion of the expansion body via the plurality of proximal connecting portions;
wherein one of the plurality of wire portions extends from one of the plurality of proximal connecting portions to a bottom portion of the recessed portion to form a proximal side surface of the recessed portion that is configured to be located on a right atrium side of the atrial septum when the expansion body expands in the radial direction with the bottom portion of the recessed portion disposed in the through-hole of the atrial septum;
wherein one of the plurality of wire portions extends from one of the plurality of distal connecting portions to the bottom portion of the recessed portion to form a distal side surface of the recessed portion that is configured to pressed against a surface on a left atrium side of the atrial septum when the distal side portion of the expansion body expands in the radial direction; and
wherein an energy transfer element configured to apply energy to the atrial septum is disposed on the proximal side surface of the recessed portion so as to transfer an energy to the atrial septum from the right atrium side of the atrial septum.

2. The medical device according to claim 1, wherein the plurality of wire portions forms a large-diameter portion in the proximal side portion of the expansion body, the large-diameter portion inclined so that a diameter of the expansion body increases, and wherein the first and second proximal bifurcated lines and the plurality of proximal merging portions are formed at the large-diameter portion.

3. The medical device according to claim 1, wherein the energy transfer element comprises a plurality of electrodes disposed on the proximal side surface of the recessed portion of the expansion body.

4. The medical device according to claim 1, wherein the recessed portion is configured to grip the atrial septum by the proximal side surface and the distal side surface of the recessed portion.

5. The medical device according to claim 1, wherein each of the plurality of wire portions forming the bottom portion of the recessed portion is connected with only the one of the plurality of wire portions extending from one of the plurality of proximal connecting portions.

6. The medical device according to claim 1, wherein the recessed portion is connected with the plurality of wire portions forming the proximal side portion of the expansion body via the plurality of proximal connecting portions by connecting each of the plurality of proximal merging portions with only one of the plurality of proximal connecting portions.

7. The medical device according to claim 1, wherein the plurality of wire portions are formed by performing laser cutting on a single metal cylindrical member so as to include the plurality of wire portions.

8. The medical device according to claim 1, wherein the plurality of distal connecting portions are disposed between the distal side surface of the recessed portion and the plurality of distal merging portions in the axial direction of the expansion body.

9. The medical device according to claim 1, wherein the proximal side portion and the distal side portion have a symmetrical shape.

10. The medical device according to claim 1, wherein the energy transfer element configured to apply the energy to the atrial septum is disposed only on the proximal side surface of the recessed portion.

11. The medical device according to claim 1, wherein the energy transfer element configured to apply the energy to the atrial septum is not disposed in the bottom portion of the recessed portion.

12. The medical device according to claim 1, wherein the energy transfer element is disposed in a projection portion projecting from a surface of the proximal side surface of the recessed portion.

13. The medical device according to claim 1, wherein the proximal side portion and the distal side portion have a symmetrical shape.

14. A treatment method of enlarging the through-hole of the atrial septum, the method comprising:
providing the medical device of claim 1;
positioning the recessed portion of the expansion body in the through-hole of the atrial septum;
expanding the expansion body in the through-hole and causing the recessed portion to move radially outward;
enlarging a diameter of the through-hole by the recessed portion expanding radially outward into the atrial septum; and
performing a maintenance treatment by using the plurality of energy transfer elements disposed on the proximal side surface of the recessed portion.

15. A medical device configured to enlarge a through-hole of an atrial septum, the medical device comprising:
an elongated shaft portion;
an expansion body linked with a distal portion of the elongated shaft portion, the expansion body configured to expand and contract in a radial direction;
wherein the plurality of wire portions form a proximal side portion, a distal side portion, and a central portion of the expansion body, the central portion being between the proximal side portion and the distal side portion;

wherein the central portion includes a recessed portion that has a recessed shape in a direction orthogonal to an axial direction of the expansion body;

wherein the plurality of wire portions forming the proximal side portion of the expansion body include a plurality of proximal bifurcated portions and a plurality of proximal merging portions disposed between the plurality of proximal bifurcated portions and the central portion of the expansion body, each of the plurality of proximal bifurcated portions dividing one of the plurality of wire portions into a first proximal bifurcated line and a second proximal bifurcated line, each of the plurality of proximal merging portions merging the first proximal bifurcated line bifurcated from one of the plurality of proximal bifurcated portions with the second proximal bifurcated line bifurcated from an adjacent one of the plurality of proximal bifurcated portions so as to serve as a proximal torsion restriction portion;

wherein the plurality of wire portions forming the distal side portion of the expansion body include a plurality of distal bifurcated portions and a plurality of distal merging portions disposed between plurality of distal bifurcated portions and the central portion of the expansion body, each of the plurality of distal bifurcated portions dividing one of the plurality of wire portions into a first distal bifurcated line and a second distal bifurcated line, each of the plurality of distal merging portions merging the first distal bifurcated line bifurcated from one of the plurality of distal bifurcated portions with the second distal bifurcated line bifurcated from an adjacent one of the plurality of distal bifurcated portions so as to serve as a distal torsion restriction portion;

wherein the plurality of wire portions forming the central portion of the expansion body include a plurality of proximal connecting portions and a plurality of distal connecting portions, each of the plurality of distal connecting portions connected with only one of the plurality of distal merging portions so as to form a single line independent of each other extending in a distal direction with a curved shape outwardly convex in the radial direction;

wherein the recessed portion is connected with the plurality of wire portions forming the proximal side portion of the expansion body via a plurality of the single lines independent of each other, and is connected with the plurality of wire portions forming the distal side portion of the expansion body via the plurality of distal connecting portions;

wherein one of the plurality of wire portions extends from one of the plurality of proximal connecting portions to a bottom portion of the recessed portion to form a proximal side surface of the recessed portion that is configured to be located on a right atrium side of the atrial septum when the expansion body expands in the radial direction with the bottom portion of the recessed portion disposed in the through-hole of the atrial septum; and wherein one of the plurality of wire portions extends from one of the plurality of distal connecting portions to the bottom portion of the recessed portion to form a distal side surface of the recessed portion that is configured to pressed against a surface on a left atrium side of the atrial septum when the distal side portion of the expansion body expands in the radial direction.

16. The medical device according to claim 15, the plurality of distal connecting portions are disposed between the distal side surface of the recessed portion and the plurality of distal merging portions in the axial direction of the expansion body.

17. The medical device according to claim 15, the plurality of proximal connecting portions are disposed between the proximal side surface of the recessed portion and the plurality of proximal merging portions in the axial direction of the expansion body.

18. The medical device according to claim 15, wherein the recessed portion is connected with the plurality of wire portions forming the proximal side portion of the expansion body via the plurality of proximal connecting portions by connecting each of the plurality of proximal merging portions with only one of the plurality of proximal connecting portions.

* * * * *